Oct. 31, 1939.  P. HILLENEK  2,178,117
ORNAMENT FOR BIRD CAGES
Filed June 2, 1937
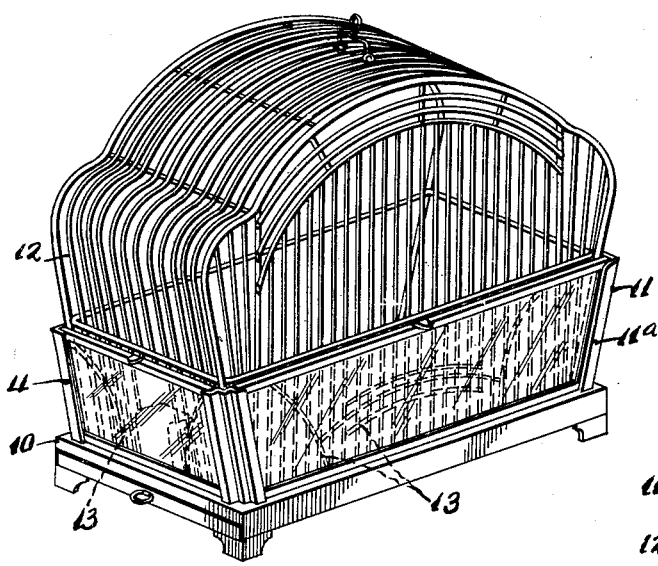
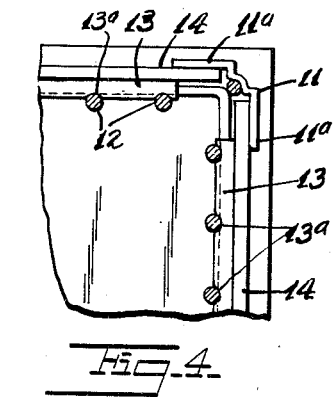
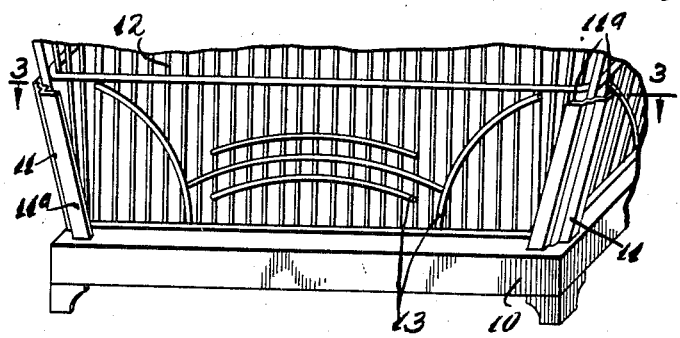
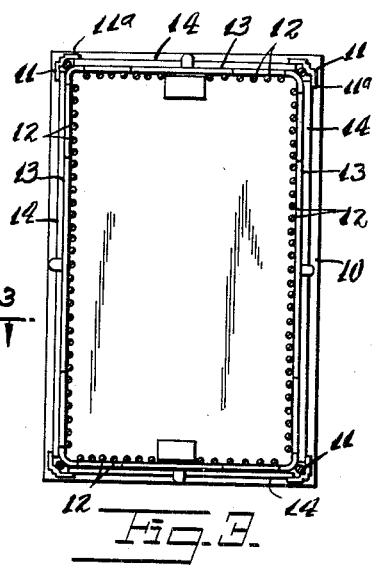
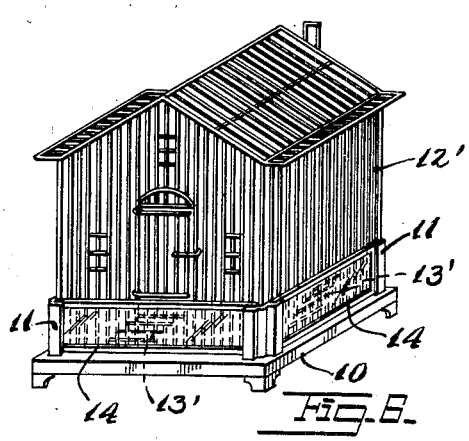
INVENTOR
Paul Hillenek
BY
Zoltan Holacheky
ATTORNEY Patented Oct. 31, 1939

2,178,117

UNITED STATES PATENT OFFICE 2,178,117

ORNAMENT FOR BIRD CAGES

Paul Hillenek, New York, N. Y.

Application June 2, 1937, Serial No. 145,972

1 Claim. (Cl. 119—17)

This invention relates to new and useful improvements in ornaments for bird cages.

The invention proposes the construction of an ornamental member which may be used in connection with bird cages or similar devices of various shapes and designs.

Still further the invention proposes that transparent members, pieces of glass or similar material, through which the ornament may be seen, be arranged to be easily replaced in the event they become broken or otherwise unusable, without the necessity of replacing the ornament.

More specifically, the invention is characterized by the provision of ornamental members having grooves formed in the back faces thereof by which the ornament may be set on the mesh of the cage in various positions, with a transparent member disposed between the ornament and vertical corner members for holding the ornaments in adjusted positions.

Another object of the invention is the construction of a device as mentioned which is simple and durable and which may be manufactured and sold at a reasonable cost.

For further comprehension of the invention, and of the objects and advantages thereof, reference will be had to the following description and accompanying drawing, and to the appended claim in which the various novel features of the invention are more particularly set forth.

In the accompanying drawing forming a material part of this disclosure:

Fig. 1 is a perspective view of a bird cage having a metal design constructed according to this invention.

Fig. 2 is an enlarged perspective view of a portion of Fig. 1.

Fig. 3 is a horizontal sectional view taken on the line 3—3 of Fig. 2.

Fig. 4 is an enlarged detailed view of a portion of Fig. 3.

Fig. 5 is a perspective view of one of the transparent members per se.

Fig. 6 shows a different type of cage embodying the same invention.

The metal ornament for bird cages, according to this invention, is to be used in conjunction with a bird cage having a base 10 from which corner angle members 11 project. A wire mesh cage 12 is mounted on the base 10 and within the compass of the angle members 11. Ornaments 13 are on the mesh cage 12 and transparent member 14 are disposed between the adjacent arms of the angle members 11 and engage over the ornaments 13. The latter may be of any suitable design to harmonize with the rest of the cage.

The angle members 11 have arms 11a disposed at right angles to each other and which extend parallel to the sides of the base member 10. The ornaments 13 may be made of wire or various types of metal and with various designs and are formed in their back faces with grooves 13a by which the ornament may be set on the wire mesh cage 12 in various positions. These grooves 13a must be spaced at distances to conform with the spacing of the wires which form the wire mesh cage 12.

The transparent members 14 are constructed of glass or similar material and are adapted to be slid in from the top of the angle members 11 so that their back faces abut the front face of the ornament 13 for holding the ornament in its fixed position on the cage 12. Thus the transparent members 14 serve a two-fold purpose of maintaining the ornaments 13 in fixed position upon the cage 12 and at the same time of preventing the bird from scattering the seeds outside of the cage. In case the transparent member 14 which is preferably made of glass, breaks, a new transparent glass may be substituted, and placed over ornament 13.

Applicant's ornamental members may be used in connection with any type of cage and the form and design of the ornament may be changed in any way to meet the requirements of the cage on which it is to be used. This is specifically shown in Fig. 6 in which a cage 12' of a different shape is provided with an ornament 13' simulating the steps which lead to the door shown in the side of the cage 12'. In other respects this form of the invention is identical with the previous form and similar parts may be recognized by corresponding reference numerals.

The operation of the device is as follows:

When it is desired to change the position of the ornament 13 the transparent member 14 is withdrawn from between the angle members 11 and the ornament 13, by lifting it out of position, which disengages the transparent member from the front face of the ornament 13, permitting the ornament to be removed from the wire mesh cage 12. The ornament is shifted in position by changing its relative position with relation to the wires forming the cage 12, and when the desired position is reached the ornaments are again placed in position with their grooves 13a engaging the wires forming the cage 12. The transparent member 14 is again slid into position with its back face engaging the front face of the ornament 13. The ornaments 13 are manually held in position while the transparent member 14 is being moved downward to prevent them from moving therewith. When the transparent member 14 is in place the friction between the adjoining faces of the member and the ornaments holds the ornaments in place on the wires forming the cage 12.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

In an ornamental bird cage including a plurality of upwardly extending vertical angle members, a wire cage within the compass of said angle members having the wire thereof extending vertically; an ornament for said cage engageable upon the outside thereof, said ornament being formed with a grooved surface in its back face for engaging the cage wire to limit movement thereof laterally of the wire, and a transparent member disposed between the adjacent arms of two of said angle members and over the outer face of said ornament for clamping said ornament against said cage frictionally to prevent movement thereof longitudinally of the cage wire, whereby said ornament may be properly positioned upon the cage wire and be manually shifted longitudinally of the cage wire while said transparent member is being slid in from the top of said angle members and being held against lateral displacement.

PAUL HILLENEK.